United States Patent Office 3,359,362
Patented Dec. 19, 1967

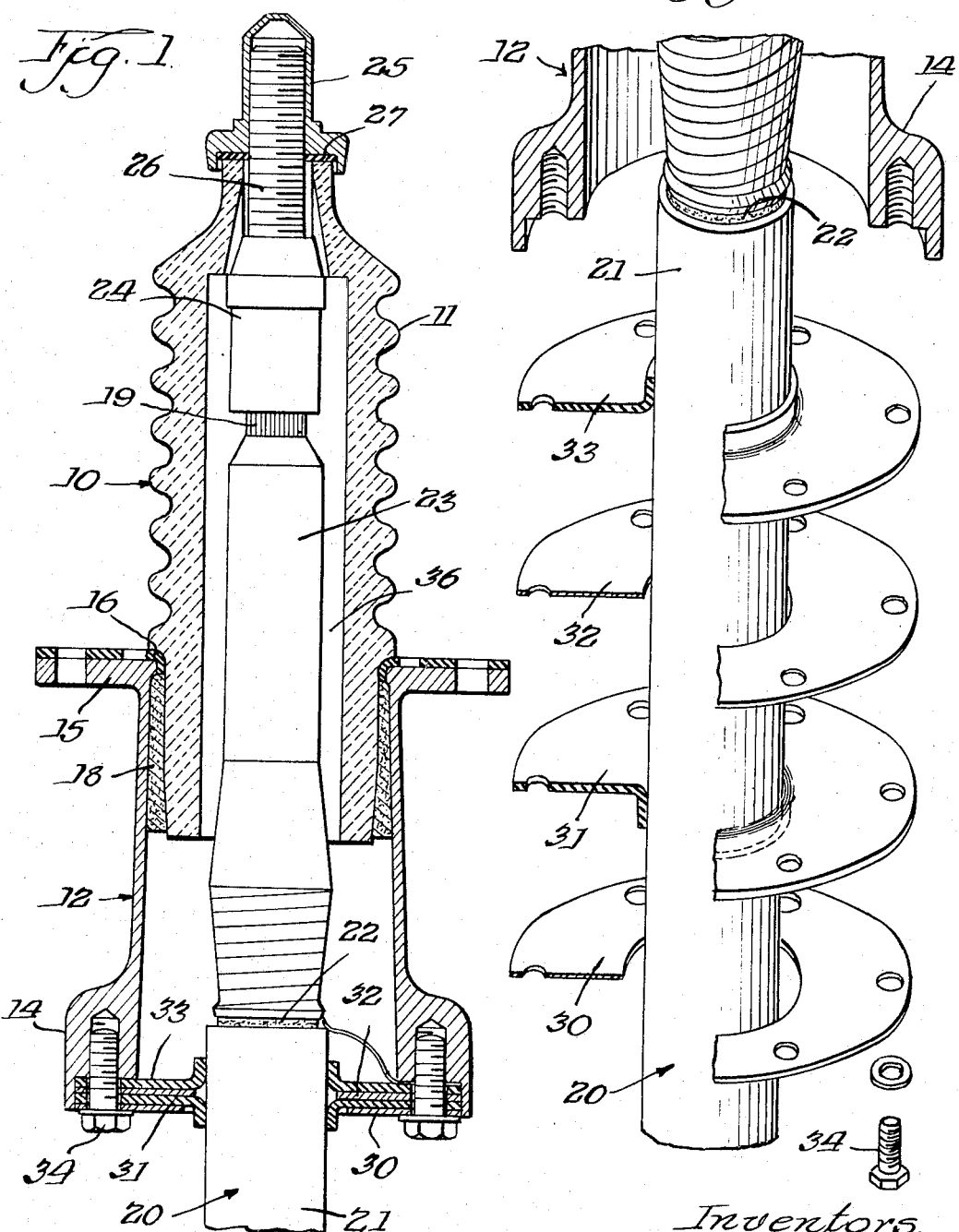

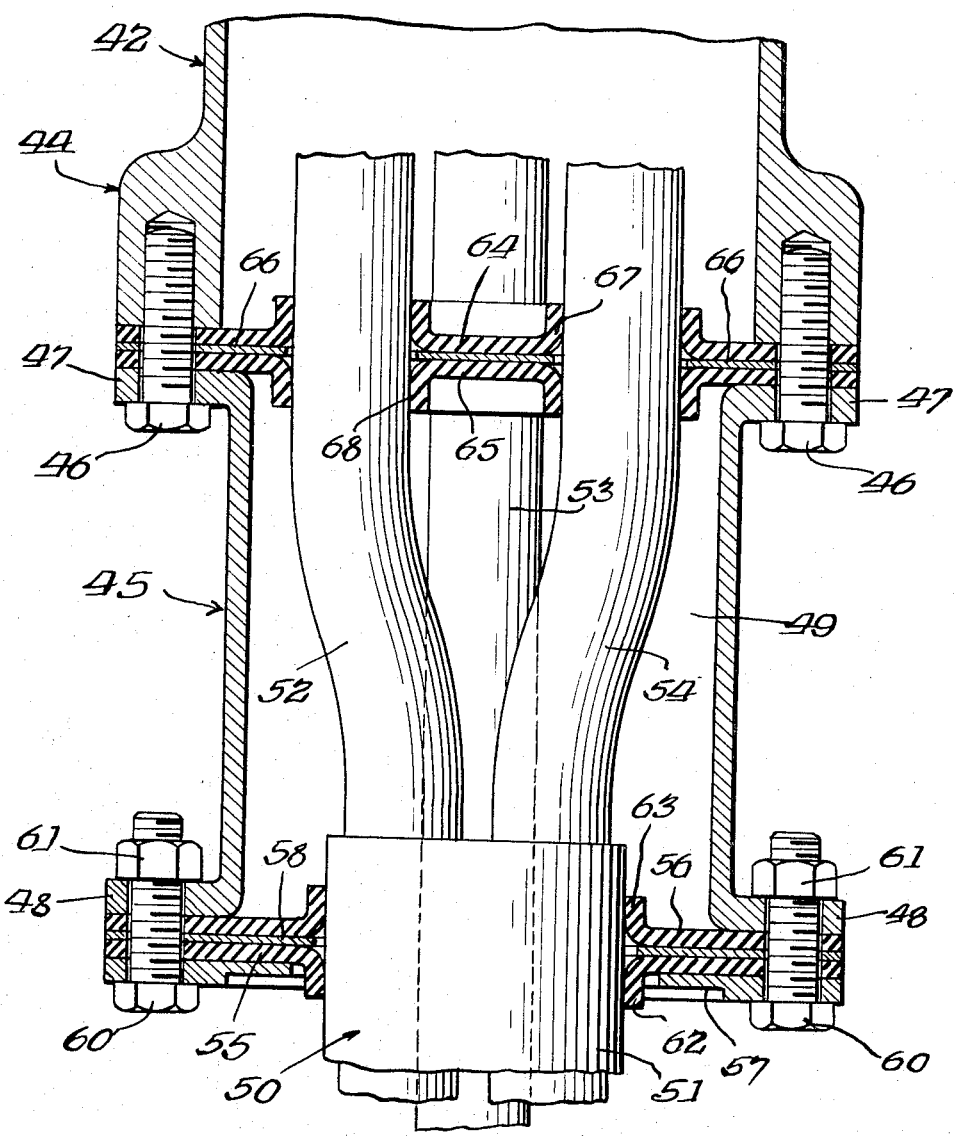

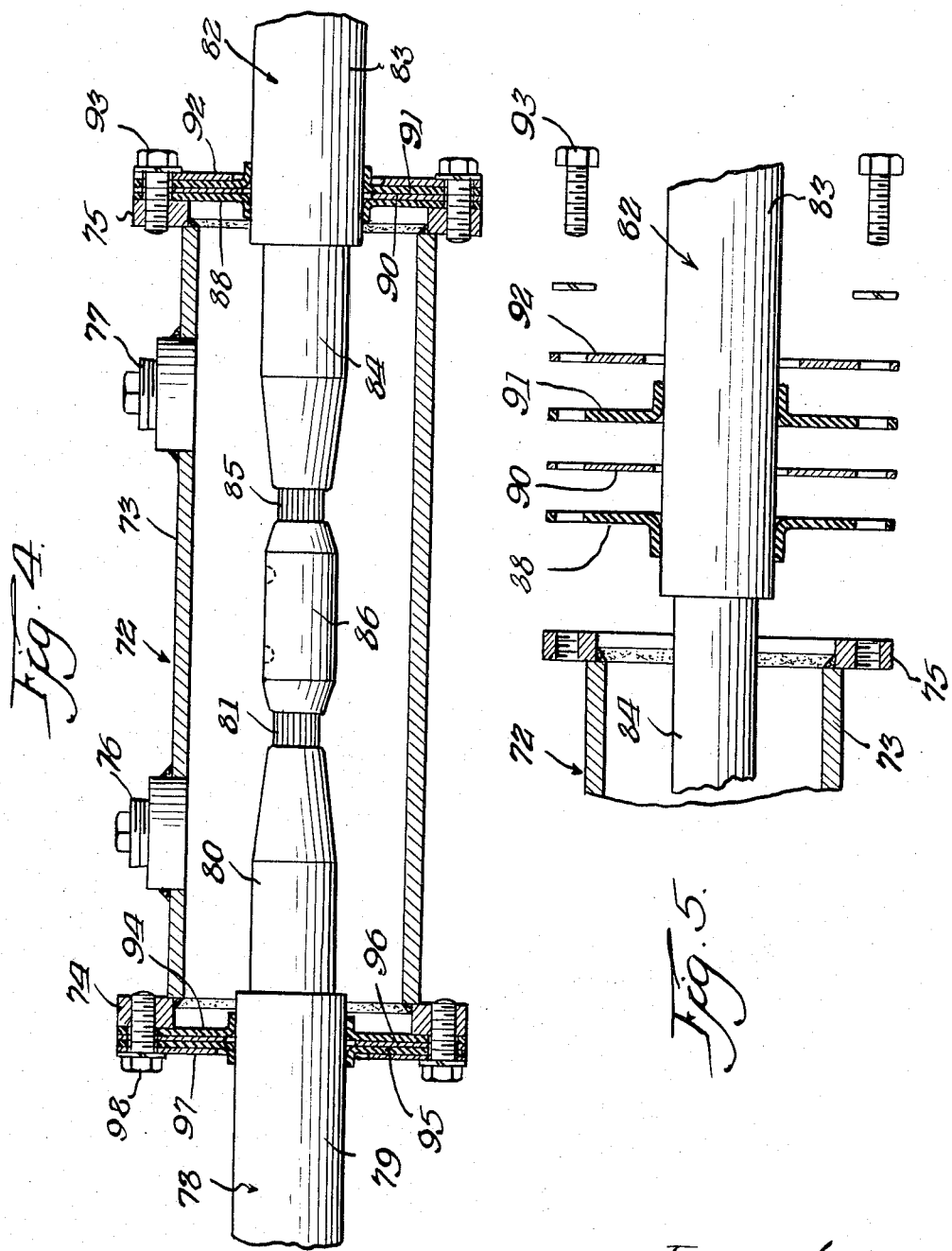

3,359,362
CABLE AND ENCLOSURE WITH DOUBLE DIAPHRAGM ENTRANCE SEAL
George E. Lusk, Downers Grove, and Robert B. Gear, Hinsdale, Ill., assignors to G & W Electric Specialty Company, Blue Island, Ill., a corporation of Illinois
Filed Dec. 19, 1966, Ser. No. 602,951
3 Claims. (Cl. 174—77)

ABSTRACT OF THE DISCLOSURE

The invention provides a seal for a power cable with respect to a pothead or similar enclosure and includes a pair of elastomeric diaphragms in back-to-back relation with a metal plate interposed between and with a second plate in contact with the outside diaphragm. The diaphragm and plate combination is sealed around the periphery thereof and the diaphragms each having sealing relation approximately centrally thereof with the sheath of the power cable, the material of the diaphragms being in tension for this purpose.

---

The invention relates to cable devices such as potheads, terminators, joints and other associated equipment for electric power cables and for telephone cables, and has reference more particularly to seals of the solderless type for said cables and which will have location between the cable device entrance and the jackets or sheaths of said cables.

The method of terminating or joining high voltage electric power and telephone cables by means of a device such as a pothead, a joint or the like, has been well known for many years. Such a device is usually filled with a dielectric compound including the asphalt type, the high viscosity polybutene mixtures, and the various insulating oils. Until recently the sheath of almost all high voltage cables were made of lead and it was possible to make a solder wipe between a metallic element of the cable terminating device and the lead sheath of the cable. However, the increased use of polyethylene insulated high voltage power and telephone cables with neoprene, polyvinyl chloride, polyethylene, or other suitable plastic jacketing has presented a need for an effective and durable seal which can be employed successfully on all types of cables.

Accordingly the main objective of the present invention is to provide a diaphragm type of entrance seal that can be employed on cables having lead sheaths and also on cables having plastic sheaths, and on various other types of insulated and jacketed cables such as rubber insulated lead covered cables, paper insulated lead shielded cables and paper insulated plastic jacketed cables.

In order to properly understand the problem and the nature of the cable entrance seal in the cable terminating or joining devices of the types described, it must be realized that such cable devices are commonly installed outdoors and may remain unattended for long periods of time. However, they are expected to render trouble free service for many years and through all kinds of weather. Furthermore, the asphalts, the polybutene mixtures and the various insulating oils employed as dielectric material within the pothead, joint or terminator housing have a softening effect on many materials that are presently used to obtain an effective seal. In addition to the temperature changes due to outdoor environment there is an added problem since the electric power cables which require seals changed in temperature as the result of the electrical loads carried by the cable conductors and are subject to cyclic expansion and contraction which makes it difficult to hold a seal.

A considerable difference in the coefficient of expansion usually exists between the metallic component of the pothead, terminator, or the like and the power cable structure itself. The sealing system used between these metallic components and the cable proper must compensate for the dimensional variations resulting from temperature changes and still maintain a positive hermetic seal. These temperature changes are a result of both environment, that is, ambient conditions, and the temperature variations in the cable due to the dielectric power factor and conductor current squared times resistance losses.

Heretofore entrance sealing assemblies used on cable terminating devices were generally of two different types, one, the stuffing box entrance sealing system which depends upon compression of gasket material against the cable insulation to develop the required seal, and, two, an entrance sealing system of the tube seal type where sealing was obtained by pressure sensitive or adhesive backed tape applied over the end of an intermediate tube surrounding the cable proper and the cable sheath itself.

The stuffing box type of entrance seal obtained its sealing action by compressing an elastomeric type gasket material. An excessive force may be transferred by sealing material to the cable plastic insulation. Most of these insulating materials have relatively poor creep characteristics. In time the insulation may flow from the stuffing box seal causing a decrease in sealing pressure. The loss of sealing pressure can result in a seal leak. Also, the creep of insulation results in a reduction of the cable insulation wall which could cause dielectric failure.

The tube sealing system requires time and considerable manual labor. Close tolerances in application of tapes and high initial costs are also characteristic of the tube sealing system. The amount of cable expansion and contraction due to temperature changes that can be accommodated by the tube seal is limited and hence the tube sealing system is subject to leak development during large temperature changes.

Another basic object of the invention is to provide an inexpensive, reliable solderless and tapeless cable terminating entrance seal for plastic and metallic jacketed electric power and telephone cables.

A more specific object of the invention is to provide a cable termination or joint sealing system which will eliminate many objectionable features inherent in prior systems and which will reduce the installation time for the cable terminating or joining device together with a reduction in initial material costs.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 1 is a vertical sectional view of a cable terminating pothead device having the diaphragm type entrance sealing structure of the invention combined therewith;

FIGURE 2 is an exploded view showing the several elements of the diaphragm type entrance seal as employed in the pothead of FIGURE 1;

FIGURE 3 is a vertical sectional view of a cable terminating device for a multiple cable and which illustrate a modification of the cable entrance sealing means of the invention;

FIGURE 4 is a sectional view taken substantially centrally of a cable joint embodying the diaphragm type entrance sealing structure of the invention; and FIGURE 5 is a fragmentary exploded view showing the component parts of the entrance sealing structure.

A typical form of pothead for terminating a power cable is shown in FIGURE 1 wherein the insulator indicated by numeral 10 is formed of any suitable ceramic, epoxy, glass or similar material and has a conventional shape including the outwardly projecting skirts 11. The base member 12 is combined with the insulator 10 to form the pothead or terminator assembly, the said base member comprising a cylindrical metal casting having a reinforced bottom section 14 and an upper end which is flanged outwardly at 15. A resilient gasket 16 is interposed between the edge of the flange and the insulator and the portion of the insulator depending below is suitably and fixedly secured to the metal base by a cementing compound 18.

The power cable indicated in its entirety by numeral 20 provides the copper or aluminum wires 19 which form the cable conductor and which are conventionally covered and shielded by the cable jacket 21, by the overshield 22 and by the cable insulation 23. The terminal end of the cable is stripped so as to expose the conductor wires 19 and to which the metal connector 24 is fixed. The metal cap nut 25 is threaded to the extension 26 of the connector and this construction provides the exterior electrical connection for the cable. A gasket 27 is confined between the cap nut 25 and the insulator so as to seal this end of the pothead assembly.

The opposite end of the assembly is closed by the improved entrance sealing means of the invention. The structure as best shown in FIGURE 2 essentially includes a bottom or outside metal plate 30, an outside sealing diaphragm 31, an intermediate metal plate 32 and the inside sealing diaphragm 33. The center metal support plate 32 is located between the sealing diaphragms which are in back to back relation and the complete combination is fixedly secured to the reinforced bottom end 14 of the casting 12 by means of the securing bolts 34 which are suitably spaced around the periphery of the entrance sealing structure. The interior 36 of the pothead or terminator is filled with proper insulating compound.

The two diaphragms 31 and 33 are identical in size, construction and in material. Both diaphragms are fully supported and secured to the pothead or terminator by means of securing bolts which clamp the diaphragms and the metal plates at their outer periphery. It is noted that both diaphragms make contact with the cable jacket or sheath. The diaphragms can be molded or cut of special elastomeric gasket sheet material. The material presently preferred for the diaphragms includes special silicone elastomers, fluorosilicone elastomers, or highly fluorinated synthetic rubber. These materials afford the greatest possible protection against environmental degradation due to ozone attack, ultraviolet radiation and oxidation. The material of the diaphragms should also allow a completely compatible system to operate at temperatures as low as minus 40 degrees Fahrenheit and as high as 250 degrees Fahrenheit.

The hole or center opening in the diaphragms which may be either punched or molded is smaller than the diameter of the cable portion around which the diaphragm seals. Thus when the parts are assembled the diaphragms have a strong sealing contact force with the cable. It is also to be noted that the diaphragm hole periphery is in tension. The size of the center opening depends upon the amount of ultimate elongation desired when the diaphragm is slid over the cable jacket or sheath. The percent elongation of the center hole periphery of the diaphragm should have a workable range from fifty percent to one hundred and fifty percent depending on the elastomer used. In sliding the diaphragm over the cable jacket or sheath the opening takes the shape of a cone section forming a snug fit around the cable to be sealed. There are no additional pressure back-up devices employed to effect the seal and consequently the amount of stress placed on the cable insulation is at a minimum.

The direction of application of the two diaphragms 31 and 33 is specific in that they are so located as to be self-energizing. The interior diaphragm 33 tightens as the internal pressure of the cable terminating device increases. Consequently the gasket sealing efficiency improves as the internal pressure increases without requiring any additional auxiliary sealing force. The outside diaphragm 31 is positioned opposite to that of the interior diaphragm so that if a vacuum develops in the sealed pothead the outside diaphragm will tighten up to improve its sealing function.

By means of the outside metal plate 30 and the intermediate metal plate 32 the sealing diaphragms are completely supported. The thickness of the center supporting metal plate should not be greater than that of the elastomeric diaphragms which are normally one-eighth inch thick. The center opening in the metal intermediate plate should not be less than one-eighth inch larger than the cable diameter and not more than one-half inch larger than the cable diameter. The outside supporting plate 30 should have a center opening of a diameter not more than seven-eighth inch larger than the cable diameter.

The cable on which the diaphragms are mounted can be lightly lubricated, using proper lubricants such as petrolatum jelly or a dielectric grade silicone grease in order to facilitate easier installation of the diaphragms. Assembly of the diaphragm seal is rather simple and with the present sealing techniques it is anticipated that the installation time can be reduced up to 75% of that normally required using previous sealing methods.

For assembling the sealing structure of the invention the cable end as the first step should be properly prepared as above described. The various elements of the sealing structure are then mounted on the cable in the proper sequence and below the entrance of the pothead or terminator all in a manner as best shown in FIGURE 2. Once the cable is properly secured and the cable terminating device mounted in its final position, the inner sealing diaphragm 33 can then be moved up close to the reinforced bottom 14 of the pothead. The lip of the diaphragm having contact with the cable jacket 21 must be pointing upwards towards the pothead. The center supporting plate 32 is moved up next into contact with diaphragm 33 and then the outer sealing diaphragm 31 follows. The lip of the outer sealing diaphragm must be pointing in the opposite direction, that is, away from the pothead. The outer sealing plate 30 is then placed in contact with diaphragm 31 and the entire assembly is secured in sealing relation with the pothead or terminator by the securing bolts 34.

In the modification of FIGURE 3 the invention has been applied to a multiple cable entry into a cable terminating device such as a pothead. The reinforced bottom end 44 of the casting 42 of the pothead device has the auxiliary base portion 45 secured thereto by securing screws 46 which clamp the flange 47 of the base portion to the pothead. The base portion 45 depends downwardly from the pothead and the open bottom end of the base portion, having the flange 48, receives the terminal end of the main or multiple cable 50. The said multiple cable has a sheath 51 which encloses and jackets the three cables 52, 53 and 54. It may be assumed that the three cables are disposed angularly about 120 degrees apart and as shown the said cables pass upwardly into the insulating portion of the pothead.

The entrance end of the base portion 45 is sealed with respect to the cable 50 by the elastomeric diaphragms 55 and 56 which are similar in all respects to the diaphragms 31 and 33, as described for FIGURES 1 and 2. Both diaphragms can be considered as supported by the metal plates 57 and 58, the former comprising the outside bottom plate and the latter comprising the intermediate plate. The clamping screws 60 and the nuts 61 clamp the arrangement of plates and resilient diaphragms to the flange 48 of the auxiliary base portion.

The downturned lip 62 of the outside diaphragm and the upturned lip 63 of the inside diaphragm have a tight sealing fit with the jacket of the multiple cable 50. The size of the center opening in the elastomeric diaphragms 55 and 56 and the size of the openings in the metal supporting plates 57 and 58 follow the same dimensions as given for the diaphragms 31 and 33.

The three cables 52, 53 and 54 are each individually sealed with respect to the pothead device by a pair of elastomeric diaphragms 64 and 65 which, however, are common to all three of the cables. In the specific arrangement as shown in FIGURE 3 the inside diaphragm 64 and the outside diaphragm 65 have associated therewith only one metal plate, namely the intermediate plate 66. The arrangement of diaphagms and plates is clamped between the flange 47 and the reinforced bottom end of the pothead device 44 by the screws 46 which additionally clamp the auxiliary base portion to the pothead. In this modification the elastomeric diaphragms and the center supporting plate are each provided with three openings located angularly about 120 degrees apart. The three cables 52, 53 and 54 pass through these openings respectively. The inside diaphragm 64 provides the upturned lips 67 which have a close sealing fit with the cables, respectively, and in a similar manner the bottom diaphragm 65 provides the downturned lips 68 which also have a close sealing fit with the cables. As previously described the cone sections 62 and 63 of the diaphragms 55 and 56 and the cone sections 67 and 68 of the diaphragms 64 and 65 are in tension and thus they maintain a good sealing contact with their respective cable jackets.

The interior space 36, FIGURE 1, and the interior space 49, FIGURE 3, are filled with a suitable insulating compound which will include those of the asphalt type, the high viscosity polybutene mixtures and the various insulating oils. One preferred compound may consist of high molecular weight polybutenes and low molecular weight polyolefin mixture. Such a compound is characterized by a high tack value as regards the polyethylene insulation, the porcelain shell, and the metal of the housing. Another characteristic of the compound is its ability to retain flexibility at low temperature levels and the same also has a relatively low coefficient of expansion. Insulating compounds having the above characteristics make possible a void free area which must be maintained within the pothead or terminator assembly.

In FIGURE 4 the invention is shown as applied to a cable joint wherein two power cables or telephone cables are electrically connected within a housing or container. The housing contains an insulating compound as above described in which the joint is thus immersed and the housing is sealed at its respective ends by the present arrangement of diaphragms in back-to-back relation. More specifically, the housing or container indicated by the numeral 72 includes a body portion 73 of any suitable metal to which the end rings 74 and 75 are secured as by welding or the like. The body portion of the housing is provided with the threaded plugs 76 and 77 which are removable for filling the housing with a suitable insulating compound.

The cable 78 is located in the left hand end of the housing and the cable 82 is located in the right hand end. The cable 78 having the jacket 79 is stripped to expose the insulation 80 and the copper or aluminum conductor wires 81. The right hand cable 82 having the jacket 83 is likewise stripped to expose the insulation 84 and the copper or aluminum conductor wires 85. The bare conductor wires 81 and 85 are joined and electrically connected by the connector 86. The cables are sealed at their respective ends of the housing by the double diaphragm arrangement of the invention, identical structure being employed at both ends and which is shown in separated relation in FIGURE 5.

An inside elastomeric diaphragm 88 is located on the entrance end of the cable. A metal plate 90 is interposed between the inside diaphragm 88 and the outside diaphragm 91. The outside diaphragm is backed by the metal plate 92. The two diaphragms and the two metal plates are secured in a sealing manner to ring 75 by means of the securing screws 93. A similar arrangement including an inside and an outside diaphragm 94 and 95 with an interposed plate 96 and an outside backing plate 97 is employed for sealing the cable 78 with respect to the housing 72. The securing screws 98 secure the cable sealing structure to the ring 74.

As previously described, the diaphragms have a central opening formed therein and which is smaller in diameter than the cables so that the cone sections of the diaphragms will have a snug fit around the cable, thus sealing the same. The diaphragms and the interposed metal plates are approximately one-eighth inch in thickness and the opening in the said plates should not be less than one-eighth inch larger than the cable diameter and not more than one half inch larger than the cable diameter. The outside supporting plate also has a central opening for accommodating the cable and which should not be more than seven-eighths inch larger than the cable diameter.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a device of the character described, the combination including an enclosure and an electric cable disposed longitudinally within the enclosure, said cable having a jacket, said enclosure providing a chamber and an open entrance end through which the cable extends, sealing means for sealing the entrance end of the enclosure with respect to the cable including a pair of elastomeric diaphragms in back-to-back relation, said diaphragms being substantially equal in thickness, one of said diaphragms being located inside and the other diaphragm being located outside as regards the enclosure, an intermediate metal plate located between said diaphragms, said intermediate metal plate having a thickness approximately equal to the thickness of an elastomeric diaphragm, an outside metal plate having contact throughout its area with the outside diaphragm, each of said diaphragms and the metal plates having a central opening therein through which the cable extends, the edges of the opening in each diaphragm having a sealing fit with the jacket of the cable, and means for securing and sealing the arrangement of diaphragms and metal plates around the peripheries thereof to the entrance end of the said enclosure.

2. A device of the character as defined by claim 1, wherein the diaphragms each have a thickness of approximately one-eighth of an inch, wherein the thickness of the intermediate plate is also about one-eighth of an inch, and wherein the central opening in the intermediate plate is larger than the cable but not more than about one-half inch larger in diameter than the cable diameter.

3. A device of the character as defined by claim 2, wherein the opening formed in the diaphragms respectively is smaller than the cable diameter so that when the cable extends through the opening the edges of the opening having contact with the jacket will be in tension, and wherein the central opening in the outside metal plate is not more than about seven-eighths of an inch larger than the diameter of the cable.

References Cited

UNITED STATES PATENTS

| | | | |
|---|---|---|---|
| 2,247,671 | 7/1941 | Tepel | 174—76 X |
| 2,625,446 | 1/1953 | Bjornstad | 277—4 X |
| 3,151,209 | 9/1964 | D'Ascoli et al. | 174—93 X |
| 3,243,499 | 3/1966 | Lusk | 174—73 |
| 3,275,331 | 9/1966 | Mastrobattista | 277—152 X |

OTHER REFERENCES

Reddehase, German application No. Q–345, published Dec. 22, 1955.

LARAMIE, E. ASKIN, *Primary Examiner.*